United States Patent [19]
Olander

[11] Patent Number: 5,861,106
[45] Date of Patent: Jan. 19, 1999

[54] COMPOSITIONS AND METHODS FOR SUPPRESSING FLAME

[75] Inventor: Donald E. Olander, Tempe, Ariz.

[73] Assignee: Universal Propulsion Company, Inc., Phoenix, Ariz.

[21] Appl. No.: 968,588

[22] Filed: Nov. 13, 1997

[51] Int. Cl.$^6$ .............................. A62D 1/00; A62D 1/02; C09K 21/02; C09K 21/06
[52] U.S. Cl. .................................... 252/7; 252/4; 252/601
[58] Field of Search ................................ 252/4, 5, 7, 601

[56] References Cited

U.S. PATENT DOCUMENTS

| | | | |
|---|---|---|---|
| H367 | 11/1987 | Reed, Jr. et al. | 149/19.4 |
| 2,136,963 | 11/1938 | Hertsch | 23/11 |
| 2,818,382 | 12/1957 | Rotival | 252/8 |
| 3,490,967 | 1/1970 | Rhoder et al. | 149/19 |
| 3,667,231 | 6/1972 | Hubbuch et al. | 60/218 |
| 3,680,483 | 8/1972 | Staudacher et al. | 149/19 |
| 3,725,156 | 4/1973 | Thompson | 149/81 |
| 3,741,585 | 6/1973 | Hendrickson et al. | 280/150 |
| 3,779,825 | 12/1973 | Blackwell | 149/19 |
| 3,972,820 | 8/1976 | Filter et al. | 252/5 |
| 4,234,432 | 11/1980 | Tarpley, Jr. | 252/8 |
| 4,380,482 | 4/1983 | Sandell | 149/21 |
| 4,398,977 | 8/1983 | Webster, III. | 149/42 |
| 4,406,797 | 9/1983 | Altman et al. | 252/8.5 |
| 4,486,317 | 12/1984 | Sandell | 252/8.5 |
| 4,552,803 | 11/1985 | Pearson | 428/262 |
| 4,619,722 | 10/1986 | Marion | 149/41 |
| 4,950,410 | 8/1990 | Pennartz | 252/7 |
| 4,961,865 | 10/1990 | Pennartz | 252/7 |
| 5,035,756 | 7/1991 | Covino | 149/37 |
| 5,466,386 | 11/1995 | Stewart et al. | 252/2 |
| 5,520,826 | 5/1996 | Reed, Jr. et al. | 252/5 |
| 5,562,861 | 10/1996 | Nimitz et al. | 252/305 |
| 5,626,786 | 5/1997 | Huntington et al. | 252/2 |

OTHER PUBLICATIONS

"Fire Extinguishers in the Workplace", 1995, National Fire Proection Association, Batterymarch Park, Quincy, MA 02269–9101.

*Primary Examiner*—Joseph D. Anthony
*Attorney, Agent, or Firm*—Pennie & Edmonds LLP

[57] ABSTRACT

The invention relates to flame suppression compositions including an inorganic halogen-containing component including bromine, iodine, or a mixture thereof, and an organic binder system having a heat of formation of less than about 200 cal/g, wherein the composition is solid at a temperature below 100° C. and combusts at a temperature between about 160° C. to 1200° C. to produce a plurality of reaction products capable of suppressing a flame upon application thereto and wherein substantially all the halogen is converted to a solid form after suppressing the flame. The invention also relates to methods of suppressing flames by combining an inorganic halogen-containing component including bromine, iodine, or a mixture thereof, with an organic binder system having a heat of formation of less than about 200 cal/g to form a solid composition, generating a plurality of reaction products from the composition in a substantially gaseous form, wherein the reaction products have a velocity, and applying the reaction products at a temperature of between about 160° C. to 1200° C. to at least one flame in an amount sufficient to suppress the flame, wherein substantially all the halogen is solid after suppressing the flame.

10 Claims, 2 Drawing Sheets

FIG. 2

COMPOSITIONS AND METHODS FOR SUPPRESSING FLAME

TECHNICAL FIELD

This invention relates to flame suppression compositions including an inorganic halogen-containing component including bromine, iodine, or mixtures thereof, and an organic binder system. Also disclosed are methods of suppressing flames by combining compositions including an inorganic halogen-containing component and an organic binder system, generating a gas by combusting a composition and applying the products thereof to at least one flame at a temperature of between about 160° C. to 1200° C. in an amount sufficient to suppress the flame.

BACKGROUND OF THE INVENTION

Flame suppression is typically achieved with the use of both physical and chemical mechanisms. As used herein, "flame suppression" or "suppression" include inhibiting, suppressing, or extinguishing flames. The physical mechanism involves heat absorption by the molecules of a flame extinguishing composition sufficient to lower the temperature of the combusting materials below the ignition point or alternatively by displacement of oxygen, either of which will terminate combustion. Generally, as the extinguishment molecule increases in size (the more atoms and bonds it contains) so do the degrees of vibrational freedom, thus the higher the vapor heat capacity and the greater the heat removal. The chemical mechanism involves interruption of the radical flame-propagation chain reactions, which are the various reactions of hydrogen, oxygen, and hydroxyl radicals that produce flame. It has been speculated that bromine atoms disrupt these chain reactions, which also typically terminates combustion. Halides are ranked for their flame suppression capabilities. Fluorine/fluorides are assigned a value of 1, while the value is 5 for chlorides, 10 for bromides, and 16 for iodides, i.e., iodine is 16 times more effective than fluorine/fluorides.

A variety of agents and techniques are currently used for flame suppression, which use either chemical or physical action, or both, to achieve flame suppression. One conventional agent is a pressurized water extinguisher model that functions solely by thermal energy absorption. Such models are not suitable, however, for use on electrical or flammable-liquid fires. Carbon dioxide ($CO_2$) and dry-chemical extinguishers are in use and typically displace oxygen and absorb thermal energy, although dry-chemicals typically leave a corrosive residue. Even better for use against grease fires are sodium bicarbonate extinguishers, as well as potassium bicarbonate, urea-based potassium bicarbonate, and potassium chloride extinguishers, although the latter types leave a heavy powdered chemical residue that can damage electrical equipment. Yet another conventional fire extinguisher is the foam (AFFF or FFFP) model, which coats flammable liquids with a chemical to lower the temperature or eliminate oxygen supply, although these are not suitable for electrical fires [Nat'l Fire Protection Ass'n, 1995].

U.S. Army studies on halogenated agents in the 1940's resulted in the adoption of the well known HALON family of flame suppression compositions. HALONS, although environmentally deleterious, are currently in use as highly effective fire suppression agents—particularly in tanks, planes, ships, and heavy engines. Conventional halogenated agents, such as carbon tetrachloride and HALONS, e.g., bromotrifluoromethane, tend to employ both physical and chemical flame suppression mechanisms.

The HALONS are bromofluorocarbons ("BFCs") that are similar to chlorofluorocarbons ("CFCs") but have the formula $C_W Br_X Cl_Y F_Z$ (where W=1 or 2, Y=0 or 1, and X+Y+Z=2W+2). HALONS must be sufficiently heated and pyrolyzed by a flame to produce free radicals before they achieve sufficient firefighting efficacy. Thus, HALONS are fairly stable and tend to work best on fires with hotter flame temperatures. This stability results in only a 5% effectivity for HALONS. As a result, these organic compounds tend to have long atmospheric lifetimes and migrate to the stratosphere where they undergo photolysis when struck by ultraviolet radiation, thereafter typically decomposing to give chlorine or bromine radicals that act to catalytically destroy the protective ozone layer of the earth, as well as possibly adding to global warming. This depletion of stratospheric ozone allows more ultraviolet light to reach the surface of the earth, resulting in increases in human skin cancer and cataracts, as well as damage to crops, natural ecosystems, and materials and various other adverse effects. Chlorine- and bromine-containing haloalkanes are known to deplete stratospheric ozone, with bromine posing a greater problem (per atom) than chlorine. Indeed, conventional brominated agents and other volatile halogenated alkenes are presently being eliminated from worldwide production, pursuant to the adoption of the Montreal Protocol and the Clean Air Act of 1990, due to their tremendous potential to destroy the stratospheric ozone layer.

The costs of perfluorocarbons are higher, and their firefighting performance is less effective, than those of the brominated agents. In weight and volume critical situations, such as aircraft, tanks, and ships, the additional quantity required for extinguishment is unacceptable. Perfluorinated agents have high global warming potential ("GWP") and atmospheric lifetimes estimated to be several thousand years. Moreover, their production and use is also being restricted by pending legislation and liability concerns of current manufacturers.

In order to quantify these concerns, halogen-containing flame suppression agents are assigned an ozone-depletion potential ("ODP") that reflects their quantitative ability to destroy stratospheric ozone. The ozone depletion potential is calculated in each case relative to CFC-11 ($CFCl_3$, trichlorofluoromethane), which has been assigned a value of 1.0. Many CFCs have ODPs near 1; HALONS have higher ODPs between 2 and 14, indicating a greater ozone depletion potential. There is thus a need for firefighting, or flame suppression, compositions that overcome the drawbacks of conventional agents as discussed above.

Firefighting compositions to replace HALONS should be effective extinguishants, relatively nontoxic, electrically nonconductive, evaporate cleanly, and have low or no environmental impact. HALONS, although they meet the first four criteria, have long atmospheric lifetimes and high ozone-depletion potentials, and are being phased out of use as discussed above.

Although it is relatively easy to identify fire suppressing agents having one, two, or three of these properties, it is very difficult to identify chemicals that simultaneously possess effective fire suppression performance, non-flammability, low toxicity, cleanliness, electrical non-conductivity, miscibility with common lubricants, short atmosphere and environmental lifetimes, low or no ODP, and very low GWP. Other characteristics are desirable, such as reduced toxicity, which is another major issue in the selection of firefighting agents. For example, the toxic effects of haloalkenes includes simulation or suppression of the central nervous system, initiation of cardiac arrhythmias, and sensitization of the heart to adrenaline. Inhalation of gaseous haloalkanes can cause bronchoconstriction, reduce pulmonary compliance, depress respiratory volume, reduce mean arterial blood pressure, and produce tachycardia. Long term effects can include hepatotoxicity, mutagenesis, teratogenesis, and carcinogenicity.

Furthermore, firefighting agents must also be chemically stable during storage and use over long periods of time, and must be unreactive with the containment system in which they are housed. Firefighting agents must typically be stable on storage at temperatures of about −20° C. to 50° C., and should decompose at flame temperatures to yield radical-trapping species.

A variety of alternative agents containing halides are known for fire suppression, although they are either less effective than HALONS or lack one of the characteristics desired in flame suppression agents as described above. Some of these methods and agents are discussed below. For example, one neat iodinated agent (trifluoroiodomethane, $CF_3I$) has long been known to have firefighting potential [*Dictionary of Organic Compounds,* Chapman and Hall, New York, p. 5477 (1982)].

U.S. Pat. No. 2,136,963 discloses a fire extinguishing agent and method that covers burning material with foam produced by a mixture of a liquid and a compound selected from high molecular quaternary ammonium, phosphonium, and sulphonium compounds. These compounds are disclosed to include a variety of bromides and iodides.

U.S. Pat. No. 2,818,381 discloses methyl bromide used for extinguishing fires. This reference also discloses another early fire extinguishing composition having 10–40 parts by weight of a chloro-difluoro methane having between one and two chlorine atoms, with 90–60 parts by weight of a mixture of bromoform and ethyl bromide.

U.S. Pat. No. 3,779,825 discloses a solid propellant composition having 60 to 90 weight percent oxidizer component selected from solid inorganic oxidizing salts of ammonium perchlorate, the alkali metal perchlorates, ammonium nitrate, the alkali metal nitrates, and mixtures thereof, at least a major portion of the oxidizer being of the perchlorates; from 10 to 40 weight percent of a binder of a rubbery material; and from 0.1 to 8 weight percent of a burning rate depressing agent.

U.S. Pat. No. 4,406,797 discloses a fire extinguishing composition having a mixture of finely divided aluminum compound and an alkali metal, stannous or plumbous halide. The metal halide may include an alkali metal, e.g., potassium iodide, bromide, or chloride, or stannous or plumbous iodide, bromide or chloride, although potassium iodide is disclosed to be preferred for use in the composition.

U.S. Pat. Nos. 4,486,317 and 4,380,482 disclose methods for preparing and compositions of a thickener in aqueous solution or slurry stabilized against thermal degradation by inclusion of any of a variety of suitable iodide and/or iodate ions in the solution or slurry. The method and composition also include a thermally stabilizing amount of iodide ion selected from hydriodic acid, ammonium iodide, an alkyl-substituted ammonium iodide, or an alkali metal or alkaline-earth metal iodide, iodate ion selected from iodic acid, ammonium iodate, an alkyl-substituted ammonium iodate, or an alkali metal or alkaline-earth metal iodate, or a combination of the iodide and iodate ion compound. The iodate ion is disclosed as effective in amounts up to about 0.6%, although an iodate concentration up to 0.3% is preferred, as higher concentrations result in conversion of iodate to iodide over time and high temperature.

U.S. Pat. Nos. 4,961,865 and 4,950,410 disclose methods and compositions for inhibiting the combustion of wood and other cellulosic materials by impregnating such material with compositions including a mixture of sodium chloride, magnesium chloride, sodium sulfate, sodium borate, calcium chloride, magnesium sulfate, and water. The composition may also optionally include calcium sulfate, potassium sulfate, calcium chloride, magnesium sulfate, magnesium bromide, and potassium chloride.

U.S. Pat. No. 5,466,386 discloses fire-extinguishing compositions of low ozone depletion potential having dry particles of ammonium bromide coated with a water repelling, solid, non-flammable adherent, such as zinc stearate, to improve flowability. The particles allegedly enhance the fire-extinguishing properties of chlorofluorocarbons and halogenated paraffins having low ozone depletion properties when dispersed therein.

U.S. Pat. No. 5,520,826 discloses a flame extinguishing pyrotechnic having an azido binder, such as a glycidyl azide polymer (GAP), an azido plasticizer, a solid tetrazole, and a perfluorocarboxylic acid salt cured to a rubbery composite by the addition of an isocyanate that flamelessly deflagrates to produce primarily nitrogen, carbon dioxide, and a fluoroolefin.

U.S. Pat. No. 5,562,861 discloses a set of environmentally safe, nonflammable, low-toxicity refrigerants, solvents, foam blowing agents, propellants, and firefighting agents that allegedly have no ozone-depletion potential. These agents include at least one fluoroiodocarbon agent of the formula $C_aH_bBr_cCl_dF_eI_fN_gO_h$, where a is 1 to 8; b is 0 to 2; c, d, g, and h are each 0 to 1; e is 1 to 18; and f is 1 to 2. This reference also notes that conventional chemical wisdom indicates that iodine-containing organic compounds are too toxic and unstable to use for these purposes, and iodocarbons have been rejected on those grounds by the majority of those skilled in the art.

U.S. Pat. No. 5,626,786 discloses a class of fire suppressant compounds having labile bromine atoms bound to non-carbon atoms that are alleged to be more effective than HALON 1211 and 1301 at suppressing fires. These compounds are disclosed to hydrolyze or oxidize rapidly in the troposphere, thereby having minimal ODP.

Reduction of toxicity, ODP, and other environmental effects must be balanced against effective flame suppression to achieve a superior flame suppression composition and method. Although more recent conventional flame suppression compositions have achieved limited ozone depletion potential, it is typically at the expense of fire suppression effectiveness or volume efficiency. Thus, the need exists for an environmentally-friendly, non-toxic fire suppression composition, and use thereof, that have better fire suppression effectiveness than HALON-type agents.

SUMMARY OF THE INVENTION

The invention relates to flame suppression compositions having an inorganic halogen-containing component including bromine, iodine, or a mixture thereof, and an organic binder system having a heat of formation of less than about 200 cal/g, wherein the composition is solid at a temperature below 100° C. when cured and combusts at a temperature between about 160° C. to 1200° C. to produce a plurality of reaction products capable of suppressing a flame upon application thereto. The reaction products are affected by the flames, thereby converting substantially all of the halogen into a solid form after suppressing the flame.

In a preferred embodiment, the inorganic halogen-containing component includes potassium bromine, potassium bromate, potassium iodine, potassium iodate, ammonium bromine, ammonium bromate, ammonium iodine, or ammonium iodate, or a mixture thereof. In a more preferred embodiment, the inorganic halogen-containing component is selected from the group of potassium iodate, potassium bromate, potassium bromine, ammonium iodate, and a mixture thereof. In a preferred embodiment, the organic binder system of the composition includes a binder resin of at least one curing binder, melt cast binder, solvated binder, or a mixture thereof, a curative present in about 1 to 3 weight percent, and a plasticizer present in about 10 to 30 weight percent, wherein the organic binder system has a heat of formation of less than about 0 cal/g. In a preferred embodiment, the organic binder system further includes at least one of a curing or bonding agent, an antioxidant, an opacifier, or a scavenger. In another preferred embodiment, the binder resin is carboxy-terminated polybutadiene, polyethylene glycol, polypropylene glycol, hydroxy-terminated polybutadiene, polybutadiene acrylonitrile, polybutadiene acrylic acid, butacene, glycol azido adipate, polyglycol adipate, or a mixture thereof.

In a preferred embodiment, the organic binder system is present in an amount of about 4 to 15 weight percent of the composition. In a more preferred embodiment, the organic binder system is present in an amount of about 8 to 12 weight percent of the composition.

In one embodiment, the reaction products of the composition include $H_2O$, CO, and a halogen-containing byproduct of the group selected from KI, KBr, $H_2$, $COH_2$, $O_2$, $I_2OH$, $K_2I$, and a mixture thereof. In another embodiment, the reaction products are in a substantially gaseous state prior to application to the flame.

The invention also relates to methods of suppressing flames by combining an inorganic halogen-containing component having bromine, iodine, or a mixture thereof, and an organic binder system having a heat of formation of less than about 200 cal/g to form a solid composition, generating a plurality of reaction products from the composition in a substantially gaseous form, wherein the reaction products have a velocity, and applying the reaction products at a temperature of between about 160° C. to 1200° C. to at least one flame in an amount sufficient to suppress the flame, wherein substantially all the halogen is solid after suppressing the flame.

In one embodiment, the gaseous reaction products are generated by combusting the composition at a temperature of about 160° C. to 1200° C. prior to application to the at least one flame. In another embodiment, the velocity of the gaseous reaction products generated from the composition is reduced to facilitate directing or channeling of the reaction products into the flame. In a preferred embodiment, the inorganic halogen-containing component is selected to include potassium bromine, potassium bromate, potassium iodine, potassium iodate, ammonium bromine, ammonium bromate, ammonium iodine, or ammonium iodate, or a mixture thereof. In a more preferred embodiment, the inorganic halogen-containing component is selected from the group of potassium iodate, potassium bromate, potassium bromine, ammonium iodate, and a mixture thereof.

In another embodiment, the organic binder system is prepared by combining a binder resin of at least one curing binder, melt cast binder, solvated binder, or a mixture thereof, a curative present in about 1 to 3 weight percent, and a plasticizer present in about 10 to 30 weight percent, wherein the organic binder system has a heat of formation of less than about 0 cal/g. In a preferred embodiment, the organic binder system is selected to further include at least one of a curing or bonding agent, an antioxidant, an opacifier, or a scavenger. In another preferred embodiment, the binder resin is selected to include carboxy-terminated polybutadiene, polyethylene glycol, polypropylene glycol, hydroxy-terminated polybutadiene, polybutadiene acrylonitrile, polybutadiene acrylic acid, butacene, glycol azido adipate, polyglycol adipate, or a mixture thereof.

In another embodiment, the reaction products are applied in an amount sufficient to extinguish the flame. In another embodiment, the reaction products generated are selected to include $H_2O$, CO, and a halogen-containing byproduct of the group selected from KI, KBr, $H_2$, $COH_2$, $O_2$, $I_2OH$, $K_2I$, and a mixture thereof.

BRIEF DESCRIPTION OF THE DRAWING

The present invention may be more clearly understood by reference to the following Figures.

DETAILED DESCRIPTION OF THE INVENTION

The present invention avoids the environmentally adverse effects of HALONS and other flame suppressing agents by providing environmentally safe, highly effective flame suppressing compositions that are also clean, electrically nonconductive, minimally toxic at worst, nonflammable (self-extinguishable), and have short atmospheric lifetime. The present invention accomplishes this with a flame suppression composition including a combination of an inorganic halogen-containing component and a binder system, which is typically organic in nature, in a solid form at a temperature below 100° C. when cured, and capable of combusting at a temperature between about 160° C. to 1200° C. to produce a plurality of reaction products for application to flames and wherein substantially all the halogen is in a solid form after suppressing the flame. The present invention also includes a method of suppressing flames by combining an inorganic halogen-containing component including bromine, iodine, or a mixture thereof, and an organic binder system having a heat of formation of less than about 200 cal/g to form a solid composition and subsequently generating a plurality of reaction products from the composition in a substantially gaseous form, and applying the reaction products at a temperature of between about 160° C. to 1200° C. to flames in an amount sufficient to suppress the flames, wherein the reaction products are converted by the flame or combustion so that substantially all the halogen is in a solid form. Typically, the reaction products are generated from the composition by combustion in the presence of oxygen, although other types of combustion may be used to generate the reaction products.

The inorganic halogen-containing component of the present invention is typically an alkali halide, which may either be an oxidizer or an inert source of halogen species. The component is preferably potassium or ammonium compounded with bromine, bromate, iodine, or iodate. More preferably, the inorganic halogen-containing component contains iodine or iodate, and most preferably the inorganic halogen-containing component contains at least 50 weight percent potassium iodate. The iodates and bromates, which form oxidizers, are dense materials that typically form free liquid prior to curing with the organic binder system. The iodines and bromines, such as potassium iodine or potassium bromine, are sources of halogen species that are not oxidizers.

Propellants, including potassium bromate, tend to accelerate combustion. Accelerants, which may be desirably used under certain situations, facilitate more rapid gas generation and administration of the composition to flames. Thus, potassium bromate is typically only used in less than about 35 weight percent of the composition. Larger amounts of potassium bromate in the composition tend to cause rapid combustion that renders the composition less effective as a flame suppressant. Potassium or ammonium iodate, however, combust relatively slowly. An increase in the combusting of the iodates may be accomplished by also including a combustion accelerant, such as potassium bromate, in the composition. Measurement of the combustion rate and optimization thereof are readily understood by those of ordinary skill in the art.

The binder system used in the composition is typically organic and includes at least a binder, or binder resin, and a plasticizer. The binder resin includes at least one of a curing binder, melt cast binder, or solvated binder, or a mixture thereof. The binder system may also include one or more of a curing or bonding agent, an antioxidant, an opacifier, or a scavenger, such as lithium carbonate.

Curing agents suitable for use with the invention may include hexamethylene diisocyanate (HMDI), isophorone diisocyanate (IPDI), toluene diisocyanate (TDI), trimethylxylene diisocyanate (TMDI), dimeryl diisocyanate (DDI), diphenylmethane diisocyanate (MDI), naphthalene diisocyanate (NDI), dianisidine diisocyanate (DADI), phenylene diisocyanate (PDI), xylene diisocyanate (MXDI), other diisocyanates, triisocyanates, higher isocyanates than the triisocyanates, polyfunctional isocyanates, or a mixture thereof. The amount of the curing agent needed is generally determined by the desired stoichiometry between the curable binder and the curing agent. The curing agent is typically present in an amount of up to about 5%. However, if a curable binder is used, the curing agent is present from about 0.5% to about 5%.

When a curing agent is used, a cure catalyst is preferably included to accelerate the curing reaction between the curable binder and the curing agent. Suitable cure catalysts may include alkyl tin dilaurate, metal acetylacetonate, triphenyl bismuth, maleic anhydride, magnesium oxide or a mixture thereof. A preferred cure catalyst is an equal percent by weight mixture of each of triphenyl bismuth, maleic anhydride and magnesium oxide. The cure catalyst, when used, is generally present from about 0.1 to 0.3% by weight.

An opacifier may be used in the binder system, generally in an amount from about 0.01% to 2% by weight. One suitable opacifier is carbon black.

Antioxidants may also be used in the invention. Suitable antioxidants may include 2,2'-bis (4-methyl-6-tert-butylphenol), 4,4'-bis(4-methyl-6-tert-butylphenol) or a mixture thereof. The antioxidant is typically present in an amount of up about 0.1 to 1% by weight.

Whether or not these additives are included, the binder system as a whole typically has a heat of formation of less than about 200 cal/g, preferably a negative heat of formation, more preferably a heat of formation of less than about −200 cal/g, and most preferably less than about −400 cal/g. Binder systems with low heats of formation are desired, as they facilitate flame suppression by absorbing more heat from the flame and they also have higher thermal stability to provide for long-term storage. Binders having a lower heat of formation when combusted with a propellant are thus preferred, as they tend to produce lower flame temperatures. The binder systems preferred also tend to be chemically stable, such that they will not react with the inorganic halogen-containing component prior to use as a flame suppressant. The binder chosen for the binder system may include any such resin having a low flame temperature and heat of formation. Several preferred binders include, for example, carboxy-terminated polybutadiene (CTPB), polyethylene glycol (PEG), polypropylene glycol (PPG), hydroxy-terminated polybutadiene (HTPB), polybutadiene acrylonitrile (PBAN), polybutadiene acrylic acid (PBAA), butacene (HTPB iron adduct), glycol azido adipate (GAP), polyglycol adipate (PGA), or a compatible mixture thereof. Nitrous cellulose and nitroglycerin are two binder resins that are undesirable for use in a binder system of the present invention, as they tend to be chemically and thermally unstable and thus unsuitable for use in fire suppression compositions. The determination of the appropriate binder type and other binder system components, and amounts suitable for use therewith, will be readily understood by one of ordinary skill in the art when selected according to the teachings herein.

The binder system may include a curative, typically present in about 1 to 3 weight percent of the organic binder system, and generally includes a plasticizer, typically present in about 10 to 30 weight percent of the organic binder system. The heats of formation for the curative and plasticizer must also be factored into the heat of formation of the binder system when they are included. Any plasticizer with a suitably low heat of formation may be used, such as triacetin or di-octyl adipate (DOA). The curative must be similarly selected, such as isophorone diisocyanate (IPDI). The heats of formation of several preferred binders, curatives, and plasticizers are shown in Table I below.

TABLE I

Approximate Heat of Formation of Binder System Components

| Material | Heat of Formation (cal/g) | Function |
| --- | --- | --- |
| BAMMO/AMMO | 240 | Binder |
| carboxy-terminated polybutadiene (CTPB) | −16 | Binder |
| polyethylene glycol (PEG) | −1,060 | Binder |
| polypropylene glycol (PPG) | −1,090 | Binder |
| hydroxy-terminated polybutadiene (HTPB) | −16 to +30 (sources vary) | Binder |
| polybutadiene acrylonitrile (PBAN) | 160 | Binder |
| polybutadiene acrylic acid (PBAA) | −84 | Binder |
| butacene (HTPB iron adduct) | −100 | Binder |
| glycol azido adipate (GAP) | 340 | Binder |
| polyglycol adipate (PGA) | −1,200 | Binder |
| Triacetin | −1,300 | Plasticizer |
| di-octyl adipate (DOA) | −730 | Plasticizer |
| isophorone diisocyanate (IPDI) | −500 | Curative |

A more preferred binder system includes PGA or HTPB with a triacetin plasticizer. The PGA/triacetin combination, for example, has a combined heat of formation of −2,500 cal/g. The combination of the inorganic halogen-containing component and the organic binder system typically produces a rubbery-like solid material that can be combusted to form reaction products capable of suppressing flames.

The flame suppressing compositions, when used in the methods of the invention, are combusted at temperatures between about 160° C. to 1200° C., preferably about 300° C. to 1100° C., to produce an effluent of primarily gaseous reaction products. These reaction products typically contain $H_2O$, CO, and a halogen-containing byproduct of the group selected from KI, KBr, $H_2$, $COH_2$, $O_2$, $I_2OH$, $K_2I$, and a mixture thereof. These reaction products are applied to flames as discussed below to suppress the flames according to the present invention. The type of halogen found in the halogen-containing byproduct depends upon the inorganic halogen-containing component present in the flame suppression composition.

Figure 1:
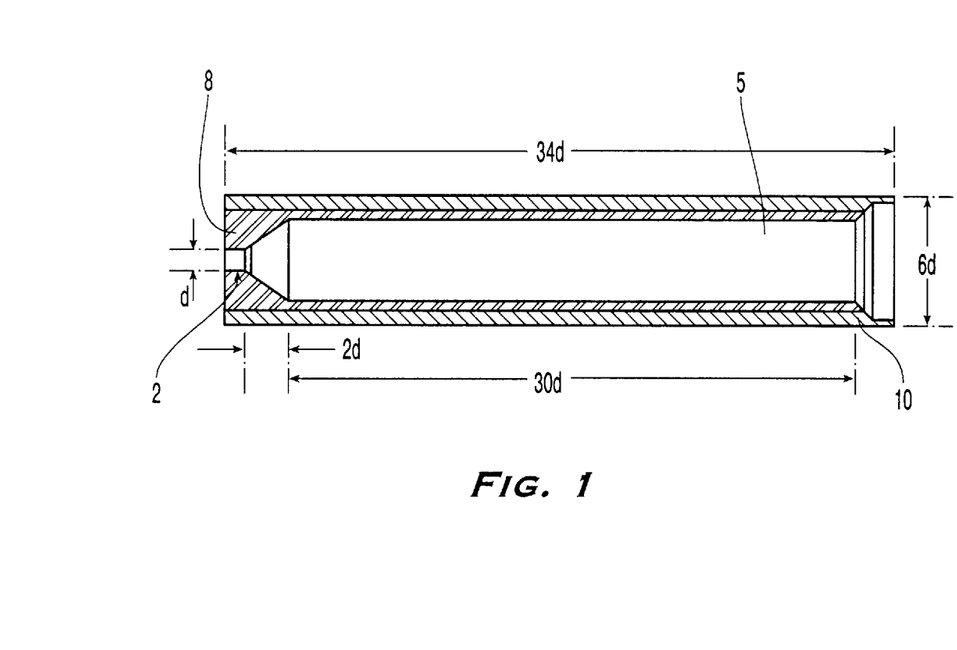
FIG. 1 illustrates a device used to reduce the velocity and direct the reaction products of the composition into a flame according to the present invention.
Figure 1A:
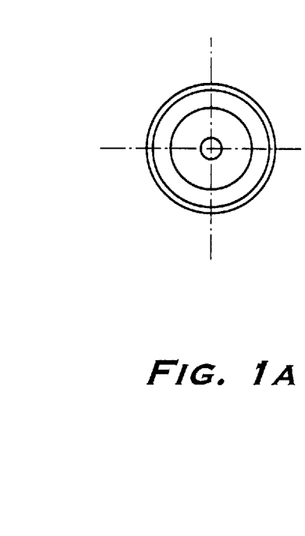
FIG. 1A illustrates an end view of one end of the device of FIG. 1 according to the present invention.

The gaseous reaction products typically travel at a sonic velocity or faster when exiting the area where the flame suppression compositions are combusted. In a preferred embodiment, the velocity of the gaseous reaction products is reduced to facilitate directing the effluent to a desired location in the flames. For example, a conventional nozzle, duct, or shock tube may be readily selected as desired by those of ordinary skill in the art to reduce the velocity of the gas and to facilitate the direction of the gas into the flame to be suppressed. One example of a conventional subsonic nozzle/shock tube device is illustrated in FIG. 1, along with the relative dimensions thereof. A throat 2 having a diameter D permits the combusted composition in the form of the reaction products to flow from the shock tube 5. Shock tubes 5 typically contain a liner 8 of a silica or phenolic composition and a shell 10 of metal. Various conventional dimensions of the shock tube 5 are described as multiples of the diameter D. For example, the length of the entire shock tube 5 is 34 D, or 34 times the diameter D of the throat 2. FIG. 1A illustrates an end view of the device in FIG. 1 from the end where the throat 2 is located. Typically, the invention uses one or more devices to store the composition, to contain the combusting composition, in a preferred embodiment to reduce the velocity of the reaction products to facilitate directing the reaction product effluent, and in a preferred embodiment to facilitate direction of the effluent to the flame. One of ordinary skill in the art with knowledge of these devices is readily able to select a suitable device for use with the present invention.

When the flame suppression composition is combusted to form the plurality of reaction products, the reaction products are in a primarily gaseous form. The reaction products are applied to the flame as with conventional flame suppression agents, i.e., typically near the bottom of the flame. The reaction products of the invention typically enter the flame at a temperature of between about 160° C. to 1200° C. Without wishing to be bound by any particular theory, it is believed that the reaction products link with oxygen to block the flow of oxygen into the portion of the flame. Flames are believed to involve a combination of two reactions: (1) an endothermic reaction that produces free radicals from a fuel; and (2) an exothermic reaction that provides heat to the endothermic reaction, where the exothermic reaction is produced by the reaction of free radicals with oxygen. By providing free radicals in the form of low or negative heat of formation reaction products, the present invention is believed to suppress the exothermic reaction that permits the fuel's free radicals and oxygen to react. The combination of the reaction products of the present invention with oxygen or other components required for the flame results in a slightly exothermic or endothermic reaction. Absent the heat of the typical exothermic reaction, endothermic production of free radicals from the fuel is reduced and results in a slowing or halt of the reactions and conditions required to maintain a flame. If enough of the reaction products of the present invention are applied to the flame, the flame is suppressed and eventually extinguished. The discussion above is not intended to restrict the invention to a particular embodiment or narrow the interpretation of any terms herein.

Figure 2:
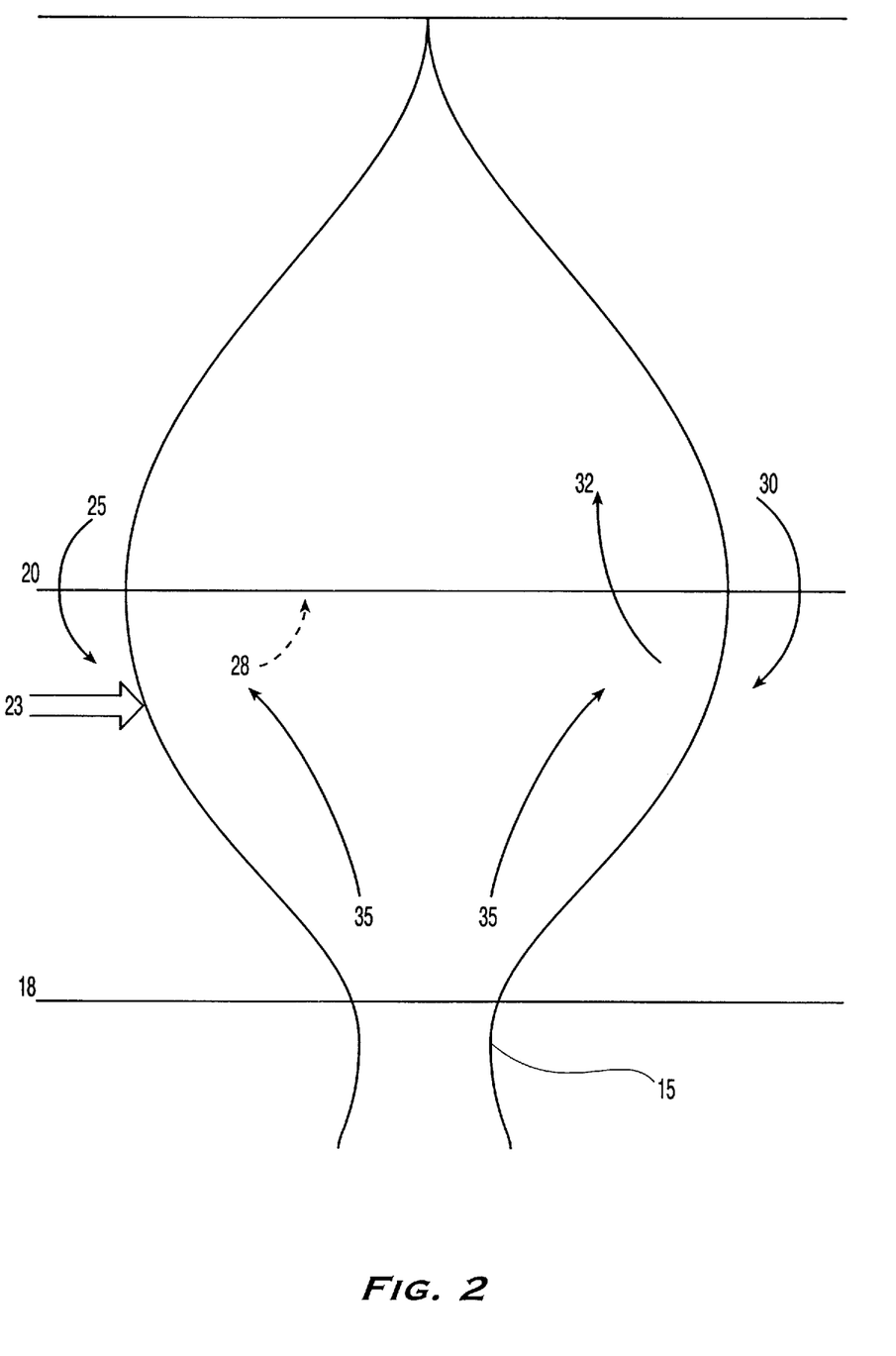
FIG. 2 illustrates a flow diagram of a flame and the insertion and effect of the reaction products of the flame suppression composition of the present invention.

FIG. 2 illustrates a sample flow diagram of the reactions believed to occur in a flame 15. There are generally two zones in a flame 15, Zone A 18 and Zone B 20. Zone A 18 is generally where the endothermic reaction occurs that splits free radicals from the fuel. Zone B 20 is generally where the exothermic reaction occurs that combines the free radicals and oxygen. The heat radiating downward from Zone B 20 to Zone A 18 helps split more free radicals in the endothermic reaction. It is believed that the radicals in the reaction products 23 of the present invention combine with oxygen 25 and inhibiting reaction 28 of the conventional radicals 35 and oxygen 25. Normally, the oxygen 30 would be freely available for bonding with the free radicals 35 to produce a conventional combustion reaction 32. Thus, FIG. 2 illustrates how the compositions and method of the present invention suppresses or extinguishes flame.

Following suppression or extinguishment of the flame, substantially all of the halogen in the reaction products is converted into a halogen-containing byproduct that preferably becomes solid as it leaves the vicinity of the flame. This solidification is believed to occur as the reaction products leave the flame and cool, thereby vastly decreasing the toxicity and ozone depletion potential of the halogen in the halogen-containing byproduct by ensuring solidification.

"Substantially all" of the component is defined herein to mean at least about 90 weight percent, preferably at least about 95 weight percent, and more preferably at least about 99 weight percent of the flame suppression composition. The "flame suppression composition(s)" of the present inventions are defined to include compositions that inhibit, suppress, and/or extinguish flames. "Flame(s)" is defined herein to include all oxidative, burning, and other combustion processes. The compositions of the present invention have effect against various types of flames, however, the present compositions are particularly effective against conventional oxidative-type flames.

EXAMPLES

The invention is further defined by reference to the following examples describing in detail the preparation of the compositions of the present invention. It will be apparent to those of ordinary skill in the art that many modifications, both to materials and methods, may be practiced without departing from the purpose and intent of this invention. All weights are in percentages unless otherwise noted.

Examples 1–39

Flame Suppression Compositions

A variety of flame suppression compositions, and the reaction products generated by combusting the compositions, were prepared according to the invention described herein and shown below in Table II. The compositions prepared included the organic binder system and one or more of an inorganic halogen-containing component containing the specific halogens of the present invention. The temperatures indicated are the temperature at which the flame suppression composition combusts to generate the reaction products for application to the flame.

TABLE II

| # | % Binder | % KIO$_3$ | % KBrO$_3$ | % KI | % KBr | % NH$_4$IO$_3$ | V % liq | Temp. °C. | Mol KI | Mol KBr | Mol Hx | Mol H$_2$O | Mol COH$_2$ | Mol O$_2$ | Mol CO | Mol I$_2$OH | Mol K$_2$I | Den lb/in$^e$ | FM |
|---|---|---|---|---|---|---|---|---|---|---|---|---|---|---|---|---|---|---|---|
| 1 | 12 | — | — | — | — | 70 | 27.5 | 490 | — | — | 42 | 0.83 | — | — | 0.290 | — | — | 0.098 | 1.9 |
| 2 | 6.5 | 93.5 | — | — | — | — | 22.8 | 1119 | 0.336 | — | — | 0.35 | — | 0.040 | 0.446 | 0.003 | 0.140 | — | — |
| 3 | 9.5H | 90.5 | — | — | — | — | 30.9 | 980 | 0.395 | — | — | 0.32 | 0.518 | — | 0.330 | — | 0.014 | — | — |
| 4 | 9.5 | 90.5 | — | — | — | — | 27.0 | 1072 | 0.351 | — | — | 0.40 | — | 0.056 | 0.472 | 0.002 | 0.032 | 0.113 | — |
| 5 | 12 | 88 | — | — | — | — | 32.4 | 1038 | 0.360 | — | — | 0.45 | 0.217 | — | 0.452 | 0.001 | 0.025 | 0.108 | — |
| 6 | 8.5 | 88 | — | — | 3.5 | — | 23.4 | 933 | 0.385 | 0.029 | — | 0.35 | — | 0.106 | 0.419 | — | 0.013 | 0.115 | — |
| 7 | 8.5 | 87 | — | — | 4.5 | — | 24.1 | 998 | 0.379 | 0.038 | — | 0.35 | — | 0.010 | 0.419 | — | 0.013 | 0.114 | — |
| 8 | 8.5 | 82 | — | — | 9.5 | — | 23.7 | 1019 | 0.349 | 0.079 | — | 0.35 | — | 0.063 | 0.419 | 0.001 | 0.016 | 0.112 | — |
| 9 | 8.5 | 75 | — | — | 16.5 | — | 23.2 | 1043 | 0.308 | 0.139 | — | 0.3 | — | 0.015 | 0.419 | 0.001 | 0.021 | 0.110 | — |
| 10 | 9.5 | 70 | — | — | 21.5 | — | 22.8 | 1049 | 0.291 | 0.180 | — | 0.34 | 0.033 | — | 0.386 | — | 0.018 | 0.108 | 2.0 |
| 11 | 8.5 | 72.5 | — | — | 19 | — | 23.0 | 1051 | 0.295 | 0.160 | — | 0.35 | 0.003 | — | 0.414 | — | 0.022 | 0.109 | 2.0 |
| 12 | 8.5 | — | 72.5 | — | 19 | — | 20.8 | 1227 | — | 0.579 | — | 0.35 | — | 0.139 | 0.417 | 0.015 | — | 0.098 | — |
| 13 | 8.5 | — | 65.5 | — | 26 | — | 19.9 | 1236 | — | 0.609 | — | 0.34 | — | 0.077 | 0.419 | 0.014 | — | 0.097 | — |
| 14 | 10 | — | 59 | — | 31 | — | 23.5 | 1220 | — | 0.603 | — | 0.38 | 0.150 | — | 0.387 | 0.010 | — | 0.094 | 1.5 |
| 15 | 8 | — | 59 | — | 31* | — | 19.2 | 1199 | — | 0.612 | — | 0.30 | — | 0.046 | 0.421 | 0.025 | — | 0.096 | — |
| 16 | 8 | — | 59 | — | 31** | — | 19.3 | 1214 | — | 0.670 | — | 0.31 | — | 0.039 | 0.423 | 0.033 | — | 0.097 | — |
| 17 | 10 | — | 57 | — | 31* | — | 23.3 | 1170 | — | 0.602 | 0.001 | 0.36 | 0.184 | — | 0.367 | 0.053 | — | 0.093 | 1.5 |
| 18 | 8.1 | — | 57 | — | 33.5 | — | 19.0 | 1199 | — | 0.623 | — | 0.30 | — | .035 | 0.421 | 0.056 | — | 0.096 | — |
| 19 | 9.1 | — | 55 | — | 33.9 | — | 21.7 | 1203 | — | 0.614 | — | 0.40 | 0.084 | — | 0.399 | 0.049 | — | 0.095 | 1.5 |
| 20 | 9.1 | — | 55 | — | 17*** | — | 20.6 | 1115 | — | 0.468 | — | 0.30 | 0.210 | — | 0.447 | 0.061 | — | 0.092 | 1.9 |
| 21 | 9.1 | — | 22.5 | — | 33.9* | 22.5 | 21.1 | 1188 | — | 0.599 | — | 0.32 | 0.084 | — | 0.408 | 0.038 | — | 0.095 | — |
| 22 | 9.1 | — | 44 | — | 33.9 | 10 | 20.6 | 1115 | — | 0.468 | — | 0.30 | 0.210 | — | 0.437 | 0.033 | — | 0.092 | 1.1 |
| 23 | 9.6 | — | — | — | — | 90.4 | 22.9 | 487 | — | — | 0.330 | 0.81 | 0.455 | — | 0.273 | — | — | 0.102 | 2.5 |
| 24 | 9.6 | 90.4 | — | — | — | — | 25.9 | 954 | 0.406 | — | — | 0.34 | — | 0.146 | 0.432 | 0.005 | 0.011 | 0.115 | — |
| 25 | 9 | 50.4 | — | 40.4 | — | — | 22.7 | 828 | 0.477 | — | — | 0.23 | 0.206 | — | 0.287 | — | 0.002 | 0.108 | 2.2 |
| 26 | 9 | 55.6 | — | 35.4 | — | — | 22.9 | 939 | 0.462 | — | — | 0.27 | 0.139 | — | 0.271 | — | 0.006 | 0.109 | — |
| 27 | 9 | 58.6 | — | 32.4 | — | — | 23.0 | 988 | 0.450 | — | — | 0.29 | 0.097 | — | 0.327 | 0.001 | 0.009 | 0.109 | — |
| 28 | 9 | 65.6 | — | 25.4 | — | — | 23.3 | 1066 | 0.412 | — | — | 0.32 | — | — | 0.404 | 0.001 | 0.023 | 0.111 | — |
| 29 | 9 | 65 | — | 26 | — | — | 23.5 | 1062 | 0.416 | — | — | 0.32 | 0.007 | — | 0.398 | 0.003 | 0.022 | 0.111 | — |
| 30 | 9 | 65.5 | — | 25.5 | — | — | 23.3 | 1066 | 0.413 | — | — | 0.40 | 0.001 | — | 0.403 | — | 0.023 | 0.111 | — |
| 31 | 9 | — | — | — | — | 81 | 18.6 | 498 | — | — | 0.431 0.021 | 0.74 | 0.215 | — | 0.385 | — | — | 0.103 | 2.0 |
| 32 | 9 | 11 | — | — | — | 80 | 21.5 | 484 | 0.067 | — | 0.380 0.014 | 0.70 | 0.317 | — | 0.369 | — | — | 0.102 | 2.1 |
| 33 | 9 | 21 | — | — | — | 70 | 22.3 | 696 | 0.069 | — | 0.029 0.031 | 0.82 | 0.116 | — | 0.381 | — | — | 0.106 | — |
| 34 | 9 | 31 | — | — | — | 60 | 22.6 | 795 | 0.138 | — | 0.213 0.051 | 0.79 | 0.046 | — | 0.386 | — | 0.002 | 0.107 | — |
| 35 | 9 | 36 | — | — | — | 55 | 22.7 | 841 | 0.162 | — | 0.170 0.041 | 0.78 | 0.029 | — | 0.391 | — | 0.003 | 0.108 | — |
| 36 | 9 | 36 + 2LC | — | — | — | 53 | 22.5 | 768 | 0.163 | — | 0.146 | 0.77 | 0.037 | — | 0.421 | — | 0.001 | 0.107 | — |
| 37 | 7.1 | 36 + 9.11C | — | — | — | 46 | 20.8 | 541 | 0.168 | — | — | 0.71 | 0.040 | — | 0.517 | — | — | 0 103 | 1.8 |
| 38 | 11 | — | — | — | — | 51 + 39 LiCO | 20.0 | 871 | 0.085 I$_2$ | 0.174 | — | 0.19 | — | — | 0.635 | 0.964 | — | — | 1.2 |
| 39 | 11 | — | 12 | — | — | 45 + 32 LiCO$_3$ | 22.3 | 385 | 0.222 0.011 | 0.072 | — | 0.28 | 0.036 | — | 0.668 | 1.02 | — | 0.087 | 1.0 |

*2% lithium carbonate was included in the composition to facilitate hydrogen halide scavenging.
**Sodium oxalate coolant was included in the composition to facilitate cooling.
***Both scavenging agents and coolant were included in the composition.

The amount of various reaction products produced by the compositions after combusting for use as a flame suppressant is shown in various mole fractions above. Moreover, several of the compositions have a figure of merit ("FM") that indicates a high potential effectiveness for flame suppression. An FM of 1.0 is a 10 pound "unit" of HALON having a 288 in$^3$ volume.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified without departing from the methods and compositions disclosed and taught by the present invention.

What is claimed is:
1. A flame suppression composition comprising:
    about 70 to 96 weight percent of the composition of an inorganic halogen-containing compound comprising bromine, iodine, or a mixture thereof; and
    about 4 to 30 weight percent of the composition of an organic binder system having a heat of formation of less than about 200 cal/g, wherein the composition is solid at a temperature below 100° C. and capable of combusting at a temperature between about 160° C. to 1200° C. to produce a plurality of reaction products capable of suppressing a flame upon application thereto and wherein substantially all the halogen is converted to a solid form after suppressing the flame.
2. The composition of claim 1, wherein the reaction products of the composition comprise H$_2$O, CO, and a halogen-containing byproduct selected from the group consisting of KI, KBr, H$_2$, COH$_2$, O$_2$, I$_2$OH, K$_2$I, and a mixture thereof.

3. The composition of claim 1, wherein the reaction products are in a substantially gaseous state prior to application to the flame.

4. The composition of claim 1, wherein the inorganic halogen-containing component comprises potassium bromine, potassium bromate, potassium iodine, potassium iodate, ammonium bromine, ammonium bromate, ammonium iodine, or ammonium iodate, or a mixture thereof.

5. The composition of claim 4, wherein the inorganic halogen-containing component is selected from the group consisting of potassium iodate, potassium bromate, potassium bromine, ammonium iodate, and a mixture thereof.

6. The composition of claim 1, wherein the organic binder system is present in an amount of about 4 to 15 weight percent of the composition.

7. The composition of claim 6, wherein the organic binder system is present in an amount of about 8 to 12 weight percent of the composition.

8. The composition of claim 1, wherein the organic binder system comprises:

a binder resin of at least one curing binder, melt cast binder, solvated binder, or a mixture thereof;

a curative present in about 1 to 3 weight percent; and a plasticizer present in about 10 to 30 weight percent, wherein the organic binder system has a heat of formation of less than about 0 cal/g.

9. The composition of claim 8, wherein the organic binder system further comprises at least one of an antioxidant, an opacifier, or a scavenger.

10. The composition of claim 8, wherein the binder resin is carboxy-terminated polybutadiene, polyethylene glycol, polypropylene glycol, hydroxy-terminated polybutadiene, polybutadiene acrylonitrile, polybutadiene acrylic acid, butacene, glycol azido adipate, polyglycol adipate, or a mixture thereof.

* * * * *

UNITED STATES PATENT AND TRADEMARK OFFICE
CERTIFICATE OF CORRECTION

PATENT NO. : 5,861,106
DATED : January 19, 1999
INVENTOR(S) : D. Olander

Page 1 of 2

It is certified that error appears in the above-identified patent and that said Letters Patent is hereby corrected as shown below:

Title page, item [54] in the title and col. 1, line 1, delete "AND METHODS".

Col. 1, line 37: please change "iodine is" to --iodides are--.

Col. 4, line 67: please change "bromine" to --bromide--.

Col. 5, line 1: please change "iodine" to --iodide--.

Col. 5, line 2: please change "bromine" to --bromide--.

Col. 5, line 2: please change "iodine" to --iodide-- , line 6, "bromine" should be --bromide--

Col. 5, line 29: please delete "$H_2$, $COH_2$, $O_2$,".

Col. 5, line 54: please change "bromine" to --bromide--.

Col. 5, line 55: please change "iodine" to --iodide--.

Col. 5, line 55: please change "bromine" to --bromide--.

Col. 5, line 56: please change "iodine" to --iodide--.

Col. 5, line 60: please change "bromine" to --bromide--.

Col. 6, line 13: please delete "$H_2$, $COH_2$, $O_2$,".

Col. 6, line 66: please change "bromine" to --bromide--.

Col. 6, line 66: please change "iodine" to --iodide--.

Col. 9, line 9: please delete "$H_2$, $COH_2$, $O_2$,".

UNITED STATES PATENT AND TRADEMARK OFFICE
CERTIFICATE OF CORRECTION

PATENT NO. : 5,861,106
DATED : January 19, 1999
INVENTOR(S) : D. Olander

It is certified that error appears in the above-identified patent and that said Letters Patent is hereby corrected as shown below:

Claim 2, line 4: please delete "$H_2$, $COH_2$, $O_2$,".

Claim 4, line 3, please change "bromine" to --bromide--.

Claim 4, line 3, please change "iodine" to --iodide--.

Claim 4, line 4, please change "bromine" to --bromide--.

Claim 4, line 5, please change "iodine" to --iodide--.

Claim 5, line 4, please change "bromine" to --bromide--.

Signed and Sealed this

Second Day of May, 2000

Q. TODD DICKINSON

*Attest:*

*Attesting Officer*                    *Director of Patents and Trademarks*